US012777454B2

(12) United States Patent
Jalkanen et al.

(10) Patent No.: US 12,777,454 B2
(45) Date of Patent: Oct. 27, 2026

(54) MANAGEMENT OF LOCATION INFORMATION

(71) Applicant: Telia Company AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 755 days.

(21) Appl. No.: 17/919,512

(22) PCT Filed: Apr. 15, 2021

(86) PCT No.: PCT/EP2021/059771
§ 371 (c)(1),
(2) Date: Oct. 17, 2022

(87) PCT Pub. No.: WO2021/209544
PCT Pub. Date: Oct. 21, 2021

(65) Prior Publication Data

US 2023/0171730 A1 Jun. 1, 2023

(30) Foreign Application Priority Data

Apr. 17, 2020 (FI) ..................................... 20205390

(51) Int. Cl.
*H04W 64/00* (2009.01)
*H04L 43/103* (2022.01)

(52) U.S. Cl.
CPC ......... *H04W 64/006* (2013.01); *H04L 43/103* (2013.01)

(58) Field of Classification Search
CPC ..... H04W 48/18; H04W 60/00; H04W 72/23; H04W 76/10; H04W 8/08; H04W 12/06; H04W 12/08; H04W 76/19; H04W 36/362; H04W 48/20; H04W 72/04
See application file for complete search history.

(56) References Cited

U.S. PATENT DOCUMENTS 7,149,504 B1 12/2006 Weaver et al.
2002/0068580 A1* 6/2002 Bala ...................... H04W 74/06 455/445
2004/0219932 A1* 11/2004 Verteuil .............. H04L 12/1485 455/456.2
2007/0281689 A1 12/2007 Altman et al.
(Continued)

OTHER PUBLICATIONS

International Search Report dated Jul. 20, 2021, for PCT/FI2021/059771, 3 pages.
(Continued)

*Primary Examiner* — Kwasi Karikari
(74) *Attorney, Agent, or Firm* — NIXON & VANDERHYE

(57) ABSTRACT

Disclosed is a method for optimizing a polling of location information of a terminal device, the method, performed by a network node, including: receiving, from the terminal device, data indicative of a movement of the terminal device, the data is received in a payload traffic on a user plane; detecting that the movement of the terminal device is within a reference range, a detection is based on data received from the terminal device; generating a first control signal for re-defining a first polling frequency to occur at a second polling frequency, the second polling frequency being less than the first polling frequency.

12 Claims, 3 Drawing Sheets

(56) References Cited

U.S. PATENT DOCUMENTS

| | | | | |
|---|---|---|---|---|
| 2008/0207224 | A1 | 8/2008 | Fahmy et al. | |
| 2009/0201896 | A1 | 8/2009 | Davis et al. | |
| 2011/0143775 | A1 | 6/2011 | Liu et al. | |
| 2013/0331119 | A1 | 12/2013 | Vaccari et al. | |
| 2014/0221013 | A1 | 8/2014 | Vaccari et al. | |
| 2016/0205625 | A1* | 7/2016 | Stojanovski | H04W 76/27 370/311 |
| 2019/0028866 | A1* | 1/2019 | Baek | H04L 65/1063 |

OTHER PUBLICATIONS

Written Opinion of the ISA dated Jul. 20, 2021, for PCT/FI2021/059771, 5 pages.

Finnish Search Report dated Nov. 5, 2020, for FI 20205390, 2 pages.

* cited by examiner

MANAGEMENT OF LOCATION INFORMATION

This application is the U.S. national phase of International Application No. PCT/EP2021/059771 filed Apr. 15, 2021 which designated the U.S. and claims priority to FI 20205390 filed Apr. 17, 2020, the entire contents of each of which are hereby incorporated by reference.

TECHNICAL FIELD

The invention concerns in general the technical field of telecommunication. More particularly, the invention concerns communication network management.

BACKGROUND

In the existing mobile communication networks it is possible to determine a location of a terminal devices served by the mobile communication network in question. The determination of the location may e.g. be performed by the network or by the terminal device. For example, the network based positioning may be performed by monitoring locations of the terminal devices, i.e. subscribers, based on cells in which the terminal devices reside. This may be performed by determining a base station serving the terminal device in question and since the mobile communication network is aware of the location of the base station as well as its coverage, it is possible to determine the location of the terminal device in at least some accuracy. Moreover, the terminal device based positioning may be performed in the terminal device e.g. based on signal measurements wherein the signals may e.g. be received from a plurality of base stations or from some external systems to the mobile communication network, such as from satellites implementing at least in part a satellite based positioning system. Examples of the terminal device based positioning may e.g. be so-called Enhanced Cell ID and OTDOA (Observed Time Difference Of Arrival) positioning methods.

Independently to the positioning techniques especially when the determination of the location is performed by the terminal device the mobile communication network, or an entity, such as an application server device, may request the location of the terminal device by inquiring it from the terminal device. For example, a service provider in a field of IoT may fetch almost in real-time information on a location of the IoT devices and, hence, monitoring a change in the location by polling it from the mobile communication network. As an example of an application area a package delivery system may be mentioned in which a package to be delivered may be equipped with a device capable of sharing its position towards network and the location of the package may be provided to a customer waiting for the package in real time.

However, a continuous increase of terminal devices, such as due to deployment of IoT systems, cause load to the mobile communication network. For example, signaling traffic required to deliver almost real-time information, such as information representing the location of the terminal device, is very high. So especially in the future where millions and millions of new types of terminal devices are expected to appear, it can easily become a major load for the mobile communication network causing challenges from telecom operators.

Hence, there is need to introduce solutions mitigating the challenges experienced in the mobile communication networks as described.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a network node, a system and a computer program product for optimizing a polling of location information.

The objects of the invention are reached by a method, a network node, a system and a computer program product as defined by the respective independent claims.

According to a first aspect, a method for optimizing a polling of location information of a terminal device is provided, the method, performed by a network node, comprises: receiving, from the terminal device, data indicative of a movement of the terminal device, the data is received in a payload traffic on a user plane, detecting that the movement of the terminal device is within a reference range, a detection is based on data received from the terminal device; generating a first control signal for re-defining a first polling frequency to occur at a second polling frequency, the second polling frequency being less than the first polling frequency.

A detection that the movement of the terminal device is within the reference range may be performed based on one of: data received from the terminal device in response to polling; data received separate to polling. For example, the detection that the movement of the terminal device is within the reference range may e.g. be performed based on an indication, received from the terminal device, that the terminal device is stationary.

A generated first control signal may be defined to cause the second polling frequency to be zero so as to prevent the polling.

Still further, the method may further comprise: receiving data indicative of the movement of the terminal from the terminal device; detecting, based on the received data, that the movement of the terminal device is out of the reference range; generating a second control signal for returning the polling to occur at the first polling frequency.

The data may be received by the network node in the payload traffic on the user plane over a communication path established through Service Capability Exposure Function, SCEF. Alternatively, the data may be received by the network node in the payload traffic on the user plane over a communication path established through Serving GateWay, SGW.

According to a second aspect, a network node is provided, the network node comprising: at least one processor; at least one memory including computer program code; the at least one memory and the computer program code configured to, with the at least one processor, cause the network node to perform: receive, from the terminal device, data indicative of a movement of the terminal device, the data is received in a payload traffic on a user plane; detect that the movement of a terminal device is within a reference range, a detection is based on data received from the terminal device; generate a first control signal for re-defining a first polling frequency to occur at a second polling frequency, the second polling frequency being less than the first polling frequency.

The network node may be arranged to perform a detection that the movement of the terminal device is within the reference range based on one of: data received from the terminal device in response to polling; data received separate to polling. For example, the network node may be arranged to perform the detection that the movement of the terminal device is within the reference range based on an indication, received from the terminal device, that the terminal device is stationary.

The network node may also be arranged to define a generated first control signal to cause the second polling frequency to be zero so as to prevent the polling.

Still further, the network node may further be caused to: receive data indicative of the movement of the terminal device from the terminal device; detect, based on the received data, that the movement of the terminal device is out of the reference range; generate a second control signal for returning the polling to occur at the first polling frequency.

The network node may be arranged to receive the data in the payload traffic on the user plane over a communication path established through Service Capability Exposure Function, SCEF. Alternatively, the network node may be arranged to receive the data in the payload traffic on the user plane over a communication path established through Serving GateWay, SGW.

According to a third aspect, a system is provided, the system comprising: a terminal device for transmitting data, and a network node according to the second aspect as defined above.

According to a fourth aspect, a computer program product for optimizing a polling of location information of a terminal device is provided which computer program product, when executed by at least one processor, cause a network node to perform the method according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
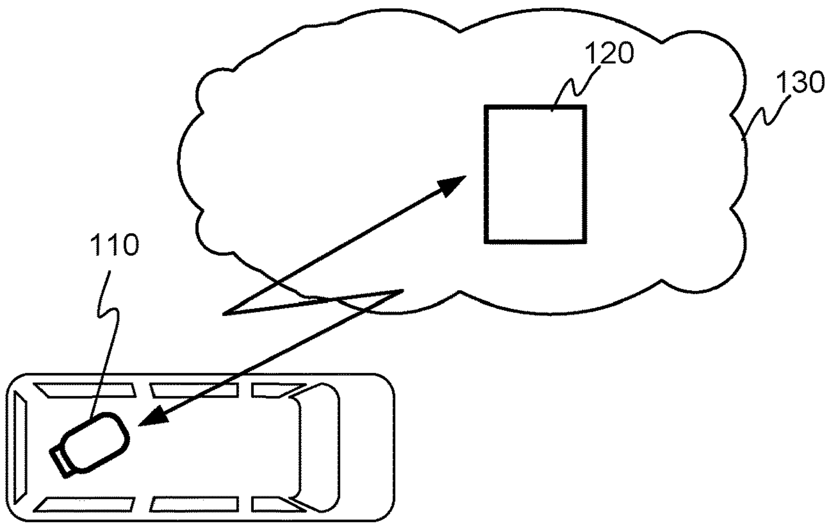
FIG. 1 illustrates schematically a communication system suitable for implementing the present invention.

FIG. 1 illustrates schematically a communication environment, or a communication system, into which the present invention may be implemented to. The communication environment may comprise a terminal device 110 and at least one network node 120 accessible over a mobile communication network 130. In the non-limiting example as schematically illustrated in FIG. 2 the terminal device 110 may be any device suitable for utilizing communication services provided by the mobile communication network 130 in the manner as will be described. For describing aspects relating to the present invention it is hereby assumed that the terminal device 110 is a so-called IoT device configured to at least transmit information relating to the location of the terminal device 110. For example, the information relating to the location may be measurement data wherein a measurement is performed by the terminal device 110 and relate to signals received from one or more base stations or similar entities, such as satellites. Some non-limiting examples of positioning methods may e.g. be so-called Enhanced Cell ID and OTDOA (Observed Time Difference Of Arrival) positioning methods. The network node 120, in turn, may be arranged to be accessible directly or through one or more network entities of the mobile communication network 130 which means that the communication between the terminal device 110 and the network node 120 may be performed through the mentioned network entities as will be described in the forthcoming description.

Figure 2A:
FIGS. 2A-2C illustrate schematically examples of communication paths between a terminal device and a network node according to some embodiments of the invention.
Figure 2B:
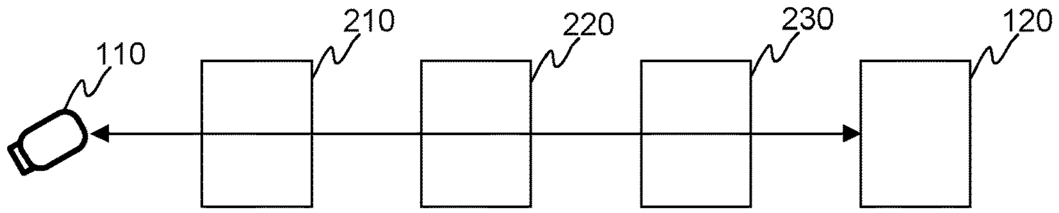
Figure 2C:
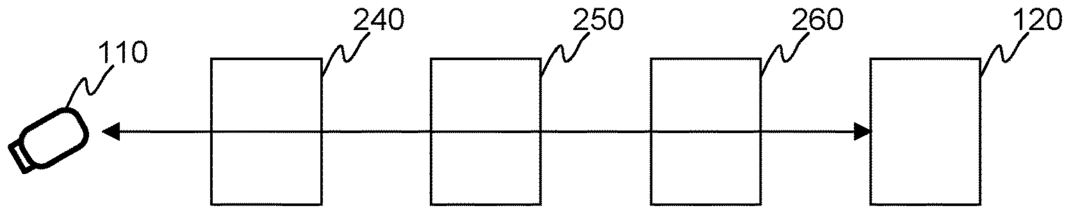

FIGS. 2A-2C illustrate schematically examples of communication paths between the terminal device 110 and the network node 120 for implementing the present invention, wherein the network node 120 dedicated to perform location related services. As a non-limiting example, the network node 120 may be so-called Location Management Function (LMF) implemented in a core network of 5G network or Evolved Serving Mobile Location Center (ESMLC) in an Evolved Packet Core (EPC) network of 4G Long-Term Evolution (LTE) network.

FIG. 2A illustrates schematically an embodiment wherein the communication between the terminal device 110 and the network node 120 is arranged through a network management entity 210, such as through a Mobility Management Entity (MME), for carrying data as will be described in the forthcoming description. In the environment of FIG. 2A the communication is advantageously performed in a signalling traffic i.e. on a control plane, such as making use of Non-IP Data Delivery (NIDD) using NAS (Non-Access Stratum) signalling, between the terminal device 110 and the network management entity 210 wherein the network management entity 210 may be configured to convert the signalling, or convey at least the required data, to IP (Internet Protocol) message in order to deliver the data to the network node 120 using e.g. standardized interface between the network management entity 210 and the network node 120. For example, the implementation of the communication path as schematically illustrated in FIG. 2A may be applied in in NB-IoT (Narrow Band Internet of Things) network implemented in LTE network.

FIG. 2B, in turn, illustrates schematically another possible implementation scenario for establishing a communication path between the terminal device 110 and the network node 120 in order to serve a need of the present invention. There the communication path is established by using so-called SCEF (Service Capability Exposure Function) route, wherein the terminal device 110 exchange data with a network management entity 210 which may consult at least a Home Subscriber Server (HSS) 220, e.g. for authentication and authorization, and in response to a successful operation the SCEF 230 may communicate with the network node 120. The communication path as schematically illustrated in FIG. 2B is performed on a user plane and the data may be delivered in payload traffic.

A still further embodiment of a communication path between the terminal device 110 and the network node 120 is schematically illustrated in FIG. 2C. In the implementation it is utilized so-called SGW/PGW (Serving GateWay/PDN GateWay) route wherein the SGW 240 routes and forwards packet data from the terminal device 110 to the PGW 250 and vice versa and wherein the PGW 250 is a gateway between an internal EPC network (represented e.g. by SGW 240) and entities, such as application services 260, residing in external packet data networks, such as the Internet or a corporate LAN. Finally, the application server 260 may be arranged to communicate with the network node 120 implementing at least part of the invention. Again, the communication path as schematically illustrated in FIG. 2C is performed on a user plane and the data may be delivered in payload traffic.

Figure 3:
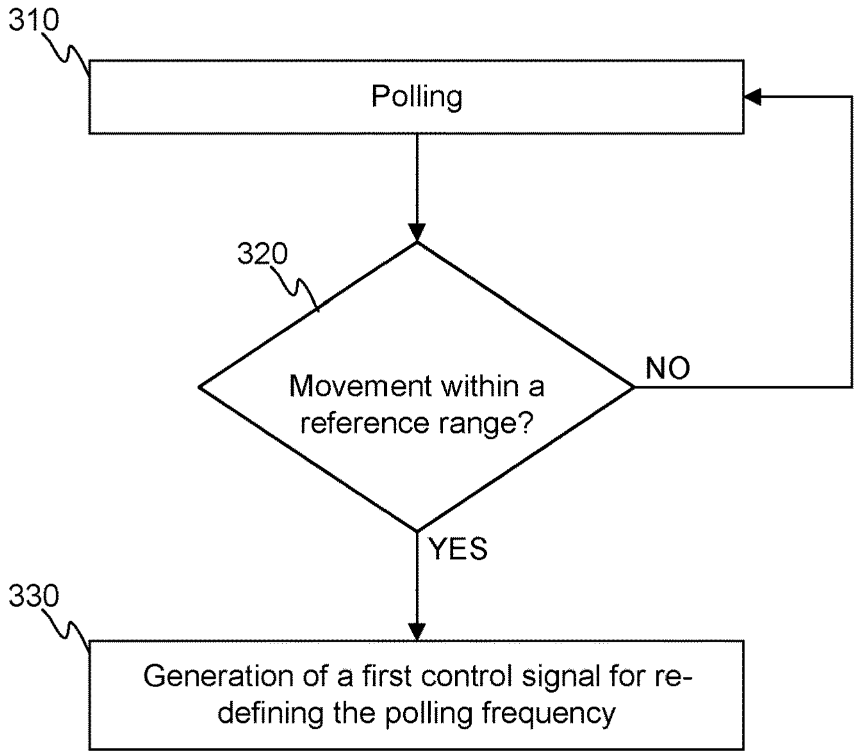
FIG. 3 illustrates schematically a method according to an embodiment of the invention.

Next at least some aspects of the present invention are described by referring to FIG. 3 illustrating schematically a method according to an example embodiment of the invention. The method may be performed for optimizing a polling of location information of a terminal device. In other words, the location of the terminal device 110 may be inquired by polling 310 it under a predefined polling frequency from the terminal device 110. Hence, the terminal device 110 is capable of generating data representing its location in one form or another. In a simple form the terminal device 110 may indicate, as a response to the inquiry received through polling, that it is either stationary or on move. Such an indication is advantageous since it does to heavily increase data traffic due to its simplicity (e.g. it may be expressed with one bit). Naturally, in some other embodiments the response to the inquiry may be more sophisticated e.g. providing further data expressing e.g. parameters relating to the movement, such as a speed of the movement, or any statistical values e.g. derived from history data. Moreover, the terminal device 110 may be arranged to process the data obtained from one or more sensors. The processing may be arranged so that in response to being capable of determining its location with an accuracy of the positioning system, one or more ranges may be defined for determining status of the terminal device 110 in order to generate the response to the inquiry received through the polling. For example, the range may be determined so that as long as the movement is less than a predetermined limit expressed e.g. as a distance moved in a predetermined period of time, it may be concluded that the terminal device 110 is stationary and if the limit is exceeded the terminal device 110 is on move. Alternatively or in addition, the terminal device 110 may be equipped with a motion sensor or an acceleration sensor and then, the predetermined limit, if any, may be defined so that a voltage level for output signal of the sensor is defined as a trigger to indicate if the terminal device 110 is on move. Furthermore, in some embodiments the terminal device 110 may be arranged to determine, or collect, data representing the location of the terminal device 110 and to transmit it to the network node 140 as the response to the inquiry received in accordance with a polling scheme.

In response to a receipt of the data in the response the network node 120 may be arranged to detect 320 if a movement of the terminal device 110 is within a reference range. The detection 320 may be based on data received from the terminal device 110 by polling it at a first polling frequency. In other words, the network node 120, or any other entity or even the terminal device 110 itself, may be arranged to request the data by polling it from the terminal device 110 at a first frequency defined in the respective entity, e.g. so that a memory stores a plurality of parameters defining the polling frequency and a parameter to be applied at different occasions in a computer program code executed by a respective entity wherein the computer program code may at least control the polling.

According to an example embodiment the detection 320 performed by the network node 120 may be arranged so that the network node 120 reads the received data and if the data type is such that it directly indicates that the terminal device 110 is either stationary or on move the network node may perform further actions as will be described. According to another example embodiment the network node 120 may be arranged to process the received data in order to generate data based on which it is possible to derive information on a movement of the terminal device 110. For example, the network node 120 may be arranged to determine, based on history data received from the terminal device 110, if a movement of the terminal device 110 has occurred in a very slow pace and if the pace is less than a predetermined limit, the movement of the terminal device 110 may be concluded to represent stationary state of the terminal device 110. In any case, based on the received information the network node 120 is arranged to detect 320 if the movement of the terminal device 110 is within the reference range or not. The reference range may e.g. represent all the values based on which the network node 120 may conclude that the terminal device 110 is stationary, i.e. below a predefined limit. In case the detection 320 indicates that the movement of the terminal device 110 is out of the reference range, the network node 120 may be caused to continue the polling the location of the mobile terminal 110 at the first frequency. On the other hand, if the detection 320 indicates that the movement of the terminal device 110 is within the reference range, the network node 120 may be arranged to generate a first control signal for re-defining the first polling frequency to occur at a second polling frequency, the second polling frequency being less that the first polling frequency. In other words, if it is detected that the terminal device 110 is not moving, or it is moving less than a predefined limit, the polling frequency may be reduced. A reduction of the polling requests helps in reducing unnecessary load the network may experience, but also because the terminal device 110 stop transmitting their location in response to the polling. Advantageously, the polling frequency is set to zero, i.e. no polling is performed i.e. it is prevented, in response to the detection that the terminal device 110 is within the reference range, such as stationary. In accordance with a non-limiting example of the present invention the first control signal may cause the computer program code controlling the polling to take the second polling frequency as the parameter, and, in that manner, replacing the first polling frequency.

Figure 4:
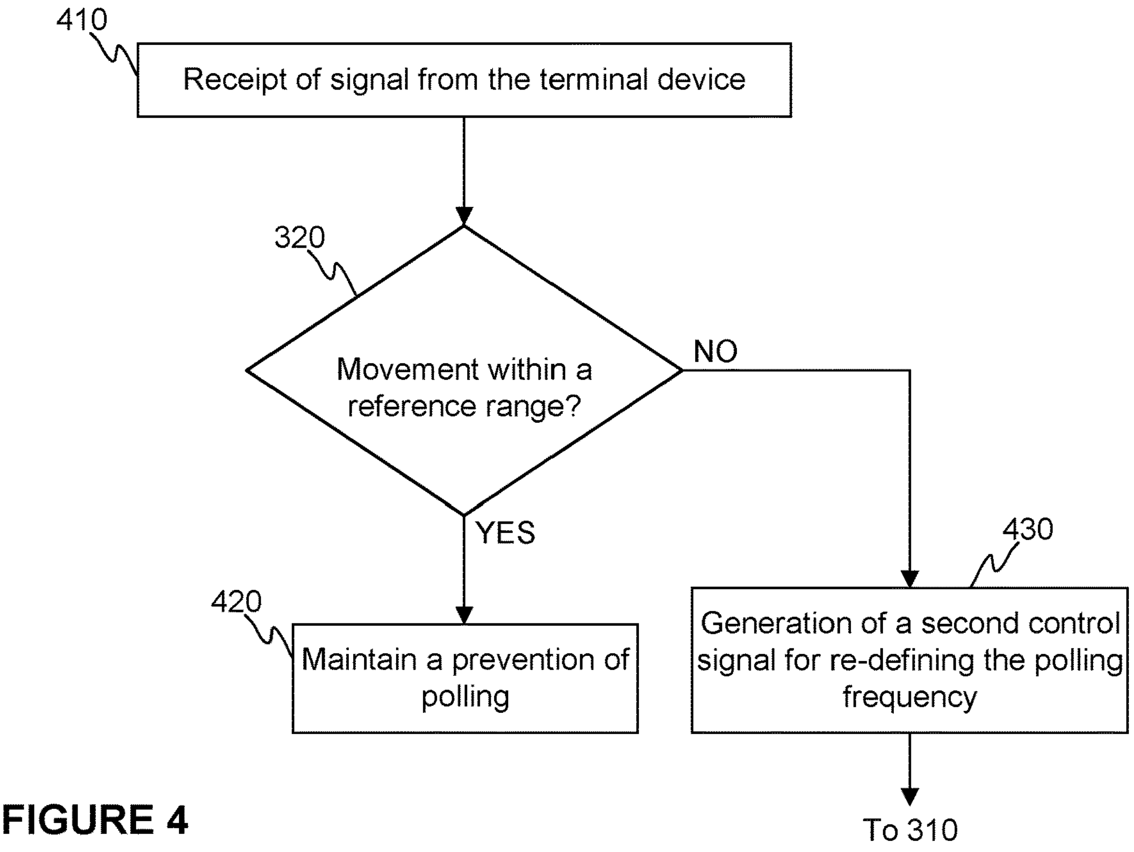
FIG. 4 illustrates schematically further aspects of a method according to an embodiment of the invention.

Some further aspects relating to at least some embodiments of the present invention are now discussed by referring to FIG. 4. FIG. 4 schematically illustrates a method continuing from step 330 described above. Namely, at some point the terminal device 110 may perform a detection that it is on move again e.g. based on data obtained with one or more sensors residing in the terminal device 110. In response to the detection the terminal device 110 may be arranged to generate a signal to the network device 120 and in response to the receipt 410 of the signal from the terminal device 110, network node 120 may detect if the data in the signal indicates that the movement of the terminal device 110 is within a reference range or not. In other words, if the data in the signal indicates that the movement is within the reference range, e.g. the terminal device 110 is stationary, the current status may be maintained 420, i.e. the polling is prevented. On the other hand, if the data in the signal indicates that the movement of the terminal device 110 is out of the reference range, the network node 120 may be arranged to generate 430 a second control signal for returning the polling to occur at the first polling frequency. In other words, the second control signal may cause the computer program code controlling the polling to take the first polling frequency as the parameter, and, in that manner, replacing the second polling frequency. In some embodiments it may be arranged that the terminal device 110 does not transmit any signal until it is again moving so that the movement is beyond the reference range. In such an embodiment, there is no need to establish the operation of step 420.

As a result of the method as schematically illustrated in FIG. 4 the location of the terminal device 110 may be updated in the network node 110 in accordance with the polling at the first polling rate.

As discussed herein the signal comprising data indicating that a movement of the terminal device is within the reference range may be a separate signal to the polling i.e. the request-response pair providing the data representing the location. Especially in a situation that the terminal device 110 may define if it is moving or not and it is arranged to generate a signal to the network node 120 indicating its status, the signal may be separate to the polling. In some other embodiments the indication, or at least data from which such an indication may be derived, may be carried from the terminal device 110 to the network node 120 in the response signal to the polling. However, it shall be understood that if the polling is totally prevented (cf. the continuation of the method as depicted in FIG. 4), the generation of the signal when the terminal device 110 is again on move, shall be arranged to the network node 110 with a separate signalling to the response signal to the polling.

As mentioned in the foregoing description the data used in the method indicating the state of motion of the terminal device 110 may be delivered on a user plane or on a control plane. In the user plane the piece of data may be transferred in a payload of the message, but on the control plane a modification of the signalling may be required. For example, the NAS signalling may be modified by establishing status indicators, such as "stop" and "move" indicators in the signalling from the terminal device 110 to the network node 120 to express if the terminal device 110 is stationary or on move.

Figure 5:
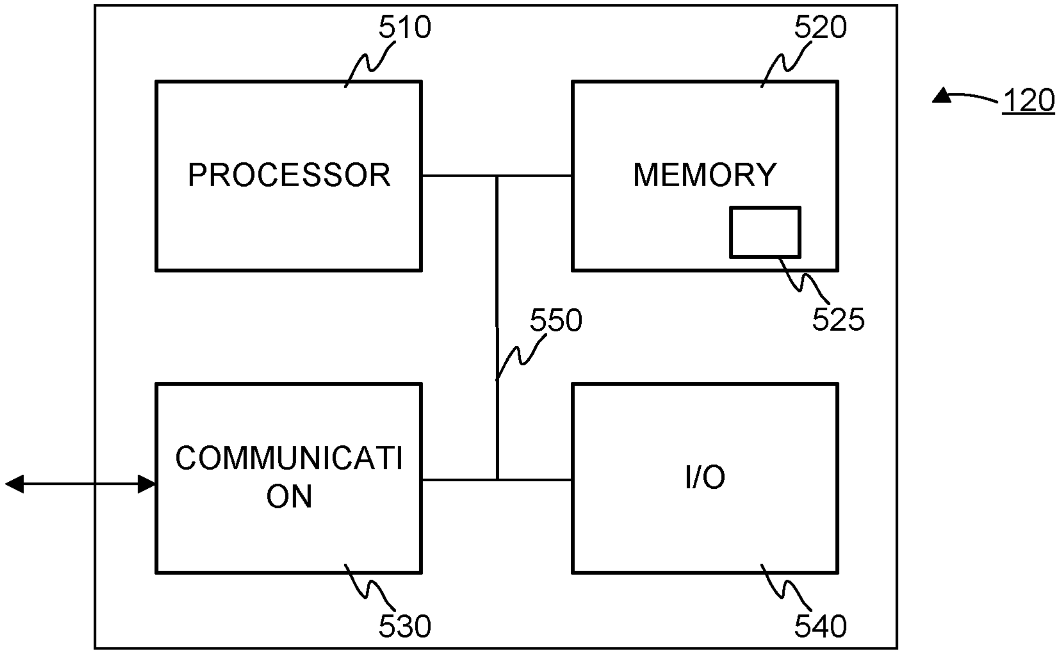
FIG. 5 illustrates schematically a network node according to an embodiment of the invention.

FIG. 5 illustrates schematically a network node 120 in accordance with an example embodiment of the invention suitable for performing the method as described in the foregoing description. The network node 120 of FIG. 5 illustrates schematically as a block diagram a non-limiting example of the network node 120. The block diagram of FIG. 5 depicts some components of an apparatus that may be employed to implement an operation of the network node 120. The apparatus comprises a processor 510 and a memory 520. The memory 520 may store data and computer program code 525. The apparatus may further comprise communication means 530 for wired and/or wireless communication with other apparatuses, such as other entities implementing the functionalities as described and possibly providing data to the network node 120 for implementing the method according to the present invention. Furthermore, I/O (input/output) components 540 may be arranged, together with the processor 510 and a portion of the computer program code 525, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus may be communicatively coupled to each other via a bus 550 that enables transfer of data and control information between the components.

The memory 520 and a portion of the computer program code 525 stored therein may further be arranged, with the processor 510, to cause the apparatus, i.e. the network node 120, to perform a method as described in the foregoing description. The processor 510 may be configured to read from and write to the memory 520. Although the processor 510 is depicted as a respective single component, it may be implemented as respective one or more separate processing components. Similarly, although the memory 520 is depicted as a respective single component, it may be implemented as respective one or more separate components, some or all of which may be integrated/removable and/or may provide permanent/semi-permanent/dynamic/cached storage.

The computer program code 525 may comprise computer-executable instructions that implement functions that correspond to steps of the method as described when loaded into the processor 510. As an example, the computer program code 525 may include a computer program consisting of one or more sequences of one or more instructions. The processor 510 is able to load and execute the computer program by reading the one or more sequences of one or more instructions included therein from the memory 520. The one or more sequences of one or more instructions may be configured to, when executed by the processor 510, cause the apparatus to perform the method be described. Hence, the apparatus may comprise at least one processor 510 and at least one memory 520 including the computer program code 525 for one or more programs, the at least one memory 520 and the computer program code 525 configured to, with the at least one processor 510, cause the apparatus to perform the method as described.

The computer program code 525 may be provided e.g. a computer program product comprising at least one computer-readable non-transitory medium having the computer program code 525 stored thereon, which computer program code 525, when executed by the processor 510 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 525 may comprise a proprietary application, such as computer program code for executing the optimization of polling of the location information in the manner as described.

Any of the programmed functions mentioned may also be performed in firm-ware or hardware adapted to or programmed to perform the necessary tasks.

Some aspects of the present invention relate to a communication system comprising a network node 120 implementing the method as described and a terminal device under monitoring.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for optimizing a polling of location information of a terminal device, the method, performed by a network node, comprising:

receiving, from the terminal device, data indicative of a movement of the terminal device, the data being received in a payload traffic on a user plane;

detecting that the movement of the terminal device is within a reference range, based on data received from the terminal device;

generating a first control signal to redefine a first polling frequency to occur at a second polling frequency defined to be zero to prevent polling of the location information of the terminal device;

receiving additional data indicative of the movement of the terminal device from the terminal device;

detecting, based on the received additional data, that the movement of the terminal device is out of the reference range; and generating a second control signal to return the polling to occur at the first polling frequency, in a case in which the movement of the terminal device is detected to be out of the reference range.

2. The method of claim 1, wherein the detecting that the movement of the terminal device is within the reference range is performed based on one of: the data received from the terminal device in response to the polling, and data received separate to the polling.

3. The method of claim 2, wherein the detecting that the movement of the terminal device is within the reference range is performed based on an indication, received from the terminal device, that the terminal device is stationary.

4. The method of claim 1, wherein the data is received by the network node in the payload traffic on the user plane over a communication path established through Service Capability Exposure Function-(SCEF).

5. The method of claim 1, wherein the data is received by the network node in the payload traffic on the user plane over a communication path established through a Serving Gateway (SGW).

6. A network node comprising:

at least one processor;

at least one memory including computer program code, wherein the at least one memory and the computer program code are configured to, with the at least one processor, cause the network node to:

receive, from the terminal device, data indicative of a movement of the terminal device, the data being received in a payload traffic on a user plane, detect that the movement of a terminal device is within a reference range, based on data received from the terminal device, generate a first control signal to redefine a first polling frequency to occur at a second polling frequency defined to be zero to prevent polling of the location information of the terminal device, receive additional data indicative of the movement of the terminal device from the terminal device, detect, based on the received additional data, that the movement of the terminal device is out of the reference range, and generate a second control signal to return the polling to occur at the first polling frequency, in a case in which the movement of the terminal device is detected to be out of the reference range.

7. The network node of claim 6, wherein the network node is configured to detect that the movement of the terminal device is within the reference range based on one of: the data received from the terminal device in response to the polling, and data received separate to the polling.

8. The network node of claim 7, wherein the network node is configured to perform the detection detecting that the movement of the terminal device is within the reference range based on an indication, received from the terminal device, that the terminal device is stationary.

9. The network node of claim 6, wherein the network node is configured to receive the data in the payload traffic on the user plane over a communication path established through Service Capability Exposure Function (SCEF).

10. The network node of claim 6, wherein the network node is configured to receive the data in the payload traffic on the user plane over a communication path established through a Serving GateWay (SGW).

11. A system, comprising:

a terminal device configured to transmit data; and a network node comprising:

at least one processor, and at least one memory including computer program code, the at least one memory and the computer program code configured to, with the at least one processor, cause the network node to:

receive data indicative of a movement of a terminal device, the data being received in a payload traffic on a user plane, detect that the movement of the terminal device is within a reference range, based on data received from the terminal device, generate a first control signal to redefine a first polling frequency to occur at a second polling frequency defined to be zero to prevent polling of the location information of the terminal device, receive additional data indicative of the movement of the terminal device from the terminal device, detect, based on the received additional data, that the movement of the terminal device is out of the reference range, and generate a second control signal to return the polling to occur at the first polling frequency, in a case in which the movement of the terminal device is detected to be out of the reference range.

12. A computer program product comprising at least one non-transitory computer-readable storage medium having computer-executable program code instructions stored therein, the program code instructions being configured, when the computer program product is executed on a computer, to cause the computer to at least:

receive data indicative of a movement of a terminal device, the data being received in a payload traffic on a user plane;

detect that the movement of the terminal device is within a reference range, based on data received from the terminal device;

generate a first control signal to redefine a first polling frequency to occur at a second polling frequency defined to be zero to prevent polling of the location information of the terminal device;

receive additional data indicative of the movement of the terminal device from the terminal device;

detect, based on the received additional data, that the movement of the terminal device is out of the reference range; and generate a second control signal to return the polling to occur at the first polling frequency, in a case in which the movement of the terminal device is detected to be out of the reference range.

* * * * *